(12) United States Patent
Darland et al.

(10) Patent No.: US 6,304,640 B1
(45) Date of Patent: Oct. 16, 2001

(54) METHOD AND SYSTEM FOR CALL DISPOSITION MESSAGING

(75) Inventors: Timothy Darland, Cedar Rapids, IA (US); Donald A. Turner, Plano, TX (US); Richard G. Moore; Patrick J. Dolphin, both of Cedar Rapids, IA (US); Cory Lenger, East Moline, IL (US)

(73) Assignee: MCI Communications Corporation, Washington, DC (US)

( * ) Notice: Subject to any disclaimer, the term of this patent is extended or adjusted under 35 U.S.C. 154(b) by 910 days.

(21) Appl. No.: 08/553,201

(22) Filed: Nov. 7, 1995

(51) Int. Cl.$^7$ .................................................. H04M 15/00

(52) U.S. Cl. ............................. 379/114.03; 379/112.01; 379/114.14; 379/114.19; 379/114.28; 379/115.01

(58) Field of Search ........................... 379/112–115, 121, 379/123, 127, 133, 134, 142, 144, 153, 157, 265, 266, 267, 229, 230

(56) References Cited

U.S. PATENT DOCUMENTS 5,008,929 * 4/1991 Olsen et al. .......................... 379/112
5,163,086 * 11/1992 Ahearn et al. ......................... 379/91

* cited by examiner

Primary Examiner—Binh Tieu

(57) ABSTRACT

A method and system for creating and sending call disposition messages. When a calling card call is validated by the telephone network which issued the card, the card issuing network can request a call disposition message. In response to validation of the call, a billing detail record is generated and stored. When the call is completed, an operator service record is generated. The operator service record and its corresponding billing detail record are matched with each other, then merged to form a merged operator services record. The merged operator services record is processed to add pricing information. If the card issuing network had requested a call disposition message, the merged operator services record is sent to a gateway coupled to the card issuing network where it is reformatted to create a call disposition message. The call disposition message is then sent to the card issuing network.

12 Claims, 9 Drawing Sheets

METHOD AND SYSTEM FOR CALL DISPOSITION MESSAGING

BACKGROUND OF THE INVENTION

1. Field of the Invention

The invention relates to billing for telecommunications services, and more particularly, to a system and method for generating call disposition messages.

2. Background Information

Callingz cards allow telephone calls to be billed to accounts which man be unrelated to home or business telephone accounts. Before a card call is connected. the card number must be validated in order to ensure proper billing and prevent fraud. When card calls are placed within the telecommunications network of the telephone system which issued the card, i.e. the card issuer network (CIN), the card issuer has control over the validation process. When calls are placed through other networks, validation is more difficult. In general. the network which accepts use of the card, i.e. the card acceptor network (CAN), cannot itself validate a card issued by a CIN. Validation must be performed by the CIN. Therefore, the card number must be communicated from the CAN to the CIN for validation and the results of the validation process must be communicated back from the CIN to the CAN. The CAN connects the call if validation was successful and terminates the call if validation failed. If the CIN requests it, the CAN will then send to the CIN a call disposition message (CDM). This validation process and the associated messages are in accordance with the protocol set forth is ITU-T Recommendation E. 113 "Validatioin Procedures for the International Telecommunications Charge Card Service".

Fraudulent use of calling cards is a problem of increasing proportion. Telephone service providers have instituted a variety of measures to deal with such fraud. Many of these measures depend upon timely receipt of calling card usage information by the card issuer. The normal billing process does not provide information in a timely manner. The CDM is intended to provide sufficient call activity information in a timely manner.

A problem arises when a CDM must be generated. A typical billing system of a telecommunications network cannot generate the information needed to create the CDM sufficiently quickly. This may be because the information is not readily available or because the information is not collected in one location. A typical billing system may take hours or even days to generate a CDM. A need exists for information to be generated and collected with improved performance in order to create the CDM in a timely manner.

SUMMARY OF THE INVENTION

The method and system for call disposition messaging generates and collects all necessary information, then generates a call disposition message. This occurs largely independently of the billing system and provides greatly improved performance over the billing system. The present invention generates CDMs much faster than previous systems. In fact, one embodiment is capable of near real-time processing.

When a request response is, received from the CIN, a billing detail record (BDR) is generated and stored. If the request response includes a request by the CIN for a CDM. the BDR indicates this. When the call is completed. an operator services record (OSR) is generated. The OSR and its corresponding BDR are matched with each other, then merged to form a new merged operator services record (MOSR). The MOSR is processed to add pricing information. If the BDR indicates that a CDNI was requested by the CIN, the MOSR is sent to a gateway where it is reformatted to create a CDM. The gateway then sends the CDM to the CIN.

BRIEF DESCRIPTION OF THE DRAWINGS

FIG. 2b is a flow diagram of a subprocess of step 204 of FIG. 2a.

DETAILED DESCRIPTION OF THE INVENTION

Figure 1A:
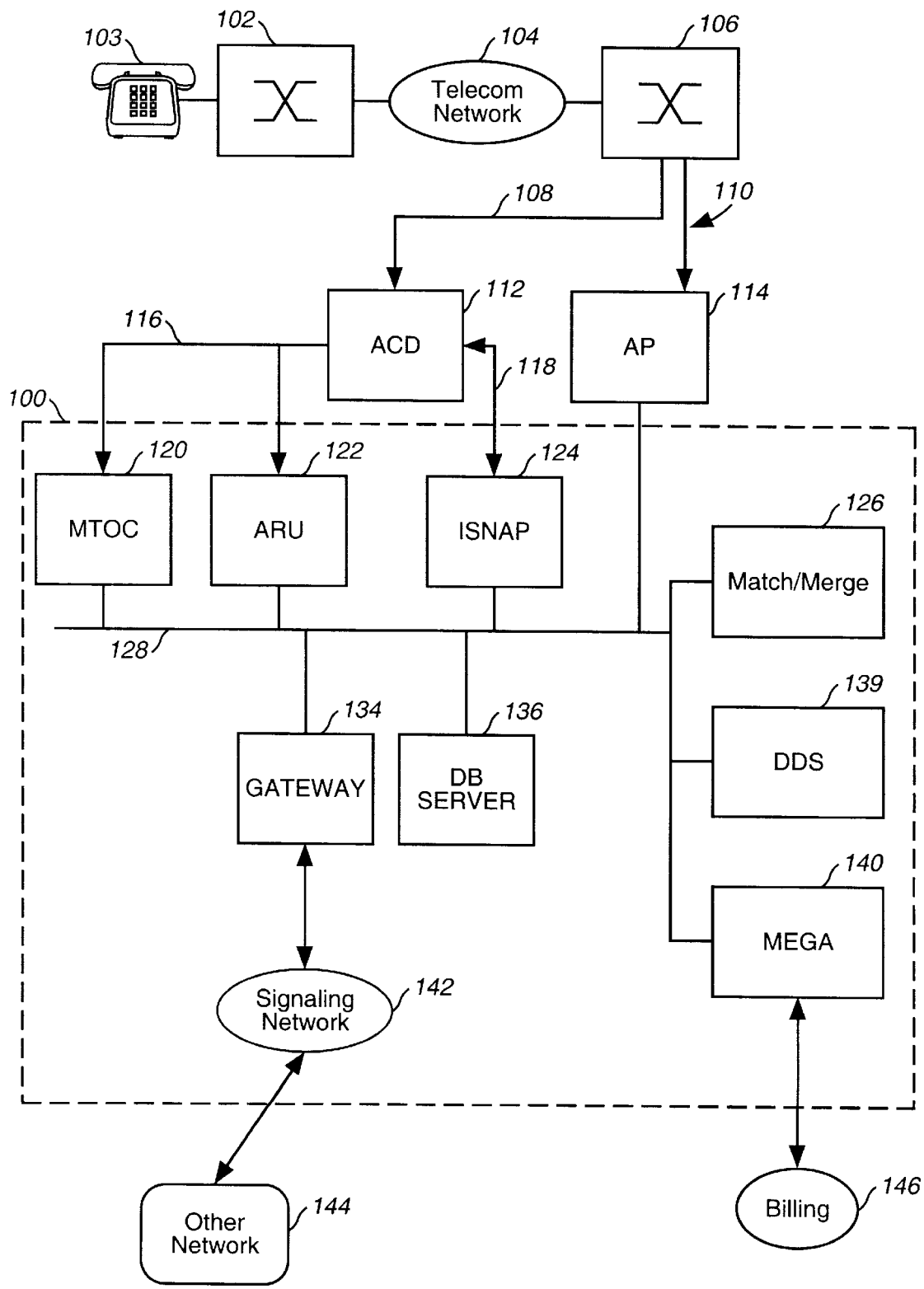
FIG. 1a is a block diagram of a call disposition messaging system 100, in accordance with the present invention.

FIG. 1a is a block diagram of a call disposition messaging system (CDMS) 100 and network elements to which system 100 is connected. Shown is telephone set 103. Set 103 is connected to end-office switch 102 which connects through telecommunications network 104 to switch 106. Switch 106 communicates with adjunct processor (AP) 114 which extracts billing information from switch 106 over data connection 110. AP 114 processes the extracted billing information and sends it to match/merge processor 126 to which AP 114 is communicatively connected. Switch 106 also connects to automatic call distributor (ACD) 112 over call connection 108. ACD 112 delivers the signaling information of the call to intelligent services network application processor (ISNAP) 124 over data connection 118. ISNAP 124 sends control data to ACD 112 over data connection 118. ACD 112 delivers the audio portion of the call to either manual telephone operator console (MTOC) 120 or automated response unit (ARU) 122 over audio connection 116. MTOC 120 is conventional equipment with which human operators manually answer calls and manually enter information obtained from the caller. ARU 122 is conventional equipment which automatically answers calls and obtains information from the caller. ARU 122 does this by, for example, playing pre-recorded prompting messages to the caller and detecting touch tone keys pressed by the caller. Although only single blocks are shown. MTOC 120 and ARU 122 represent multiple equipment located in diverse geographical locations, but all communicating over local/wide area network (LWAN) 128. Devices such as MTOC 120 and ARU 122 can be generically termed operator service devices (OSD).

Call disposition messaging system (CDNS) 100 includes MTOC 120, ARU 122. ISNAP 124, gateway 134. database server (DBS) 136. marchlmerue processor 126. data distribution system (DDS) 139 and MIEGA processor 140 which are all communicatively connected by LWAN 128. LWAN 128 is a standard network, such as Ethernet or token-ring.

Gateway 134 interfaces system 100 to signaling network 142. Signaling network 142 is a standard telecommunications signaling system, such as ANSI SS7, ITU CCS7 or X.25. Gateway 134 provides protocol translation and formatting functions necessary to communicate messages through signaling network 142 to and from telecommunications network 144. Network 144 is a telephone system operated by a different service provider than the operator of system 100 and network 104. MEGA processor 140 is a computer system which provides pricing information on a call by call basis. It is shared between the call disposition messaging process and the standard billing stream 146. Data distribution system 139 is a computer system which provides two way distribution of data amongst a plurality of distributed databases. It routes data to the appropriate destinations and replicates it when necessary to provide duplicate data to multiple destinations.

Figure 1B:
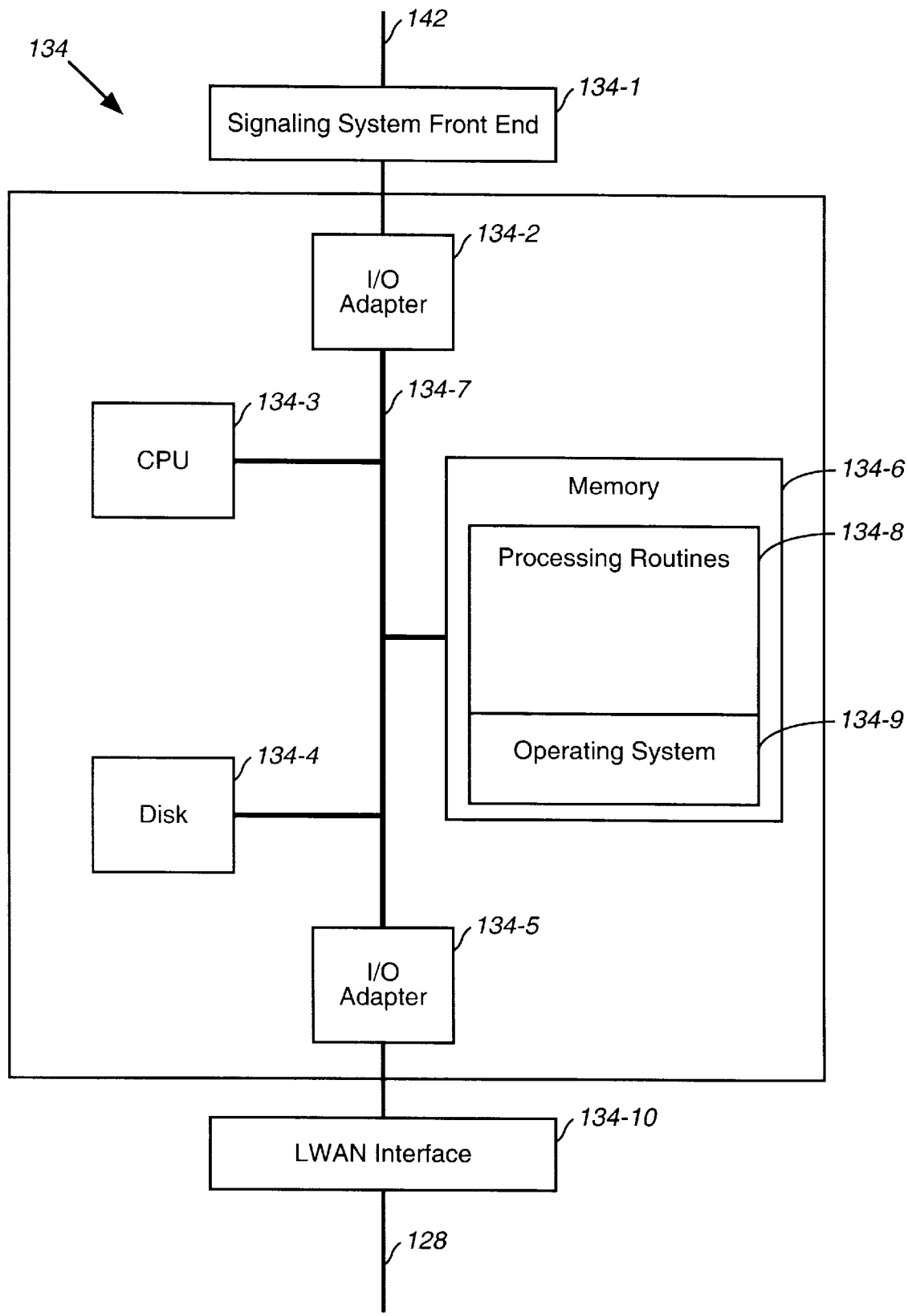
FIG. 1b is an exemplary block diagram of a gateway 134.

FIG. 1b is a block diagram of gateway 134. Gateway 134 includes several elements. CPU 134-3 executes program instructions and processes data. Disk 134-4 stores data to be transferred to and trom memory. I/O Adapters 134-2 and 134-5 communicate with other devices and transfer data in and out of Gateway 134. Memory 134-6 stores program instructions executed by and data processed by CPU 134-3. All these elements are interconnected by bus 134-7, which allows data to be intercommunicated between the elements. Gateway 134 also includes LWAN Interface 134-10 connected to I/O Adapter 134-5 and LWAN 128 and also includes signalinig system front end 134-1 connected to I/O Adapter 134-2 and signaling network 142.

Memory 134-6 is accessible by CPU 134-3 over bus 134-7 and contains operating system 134-9 and processing routines 134-8. Messages received from signaling network 142 are in a standard signaling format such as ANSI SS7. ITU CCS7 or X.25. Gateway 134 parses incoming messaues from the signaling network and converts them to formats used by CDMS 100. Gateway 134 also generates outgoing signaling messages based on information received from other parts of CDMS 100.

Figure 1C:
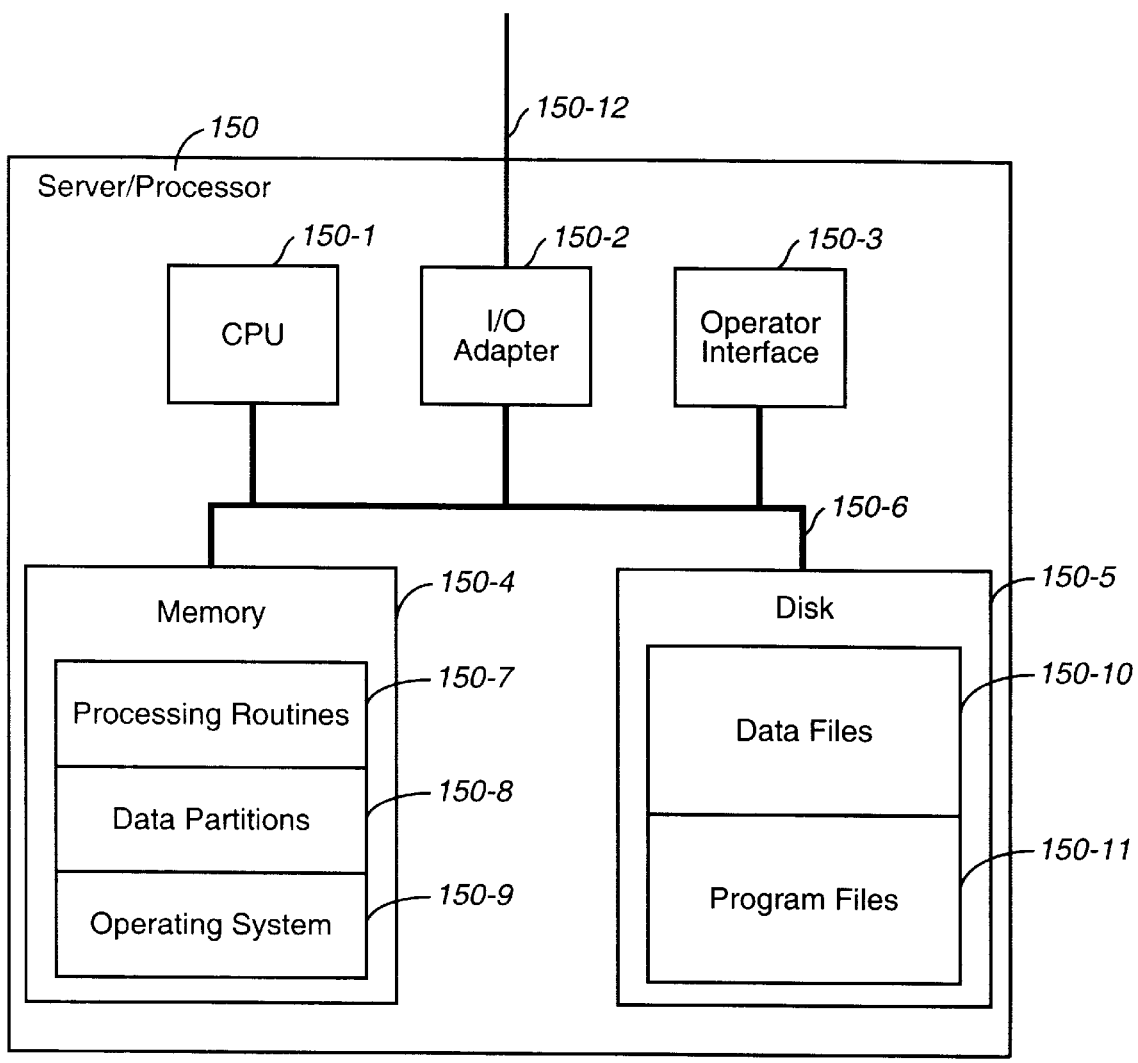
FIG. 1c is an exemplary block diagram of a server/processor 150.

FIG. 1c is an exemplary block diagram of a server/processor 150 which is representative of ISNAP 124. DBS 136, match/merge processor 126, DDS 139 and MEGA processor 140. Each of these blocks comprise at least one such server/processor. Although only one each of ISNAP 124, DBS 136, match/merge processor 126, DDS 139 and MEGA processor 140 are shown in FIG. 1, it is well known in the art that a distributed architecture in which more than one server/processor performs each function is entirely equivalent. DDS 139 is a data distribution system which supports such a distributed architecture. Server/processor 150 includes a CPU 150-1, for executing program instructions and processing data, memory 150-4. for storing program instructions executed by and data processed by CPU 150-1, disk storage 150-5. for storing data to be transferred to and from memory, and at least one I/O adapter 150-2, for communicatino with other devices and transferring data in and out of the computer system over connection 150-12. Svstem 150 may also include an operator interface 150-3. for providing status information to and accepting commands from a system operator. All these elements are interconnected by bus 150-6, which allows data to be intercommunicated between the elements. I/O adapter 150-2 represents one or more I/O adapters or network interfaces which may connect to local or wide area networks. such as, for example LWAN 128. Therefore, connection 150-12 represents a LAN or WAN, such as, for example LWAN 128. Disk 150-5 includes data files 150-10 and program files 150-11.

Figure 2A:
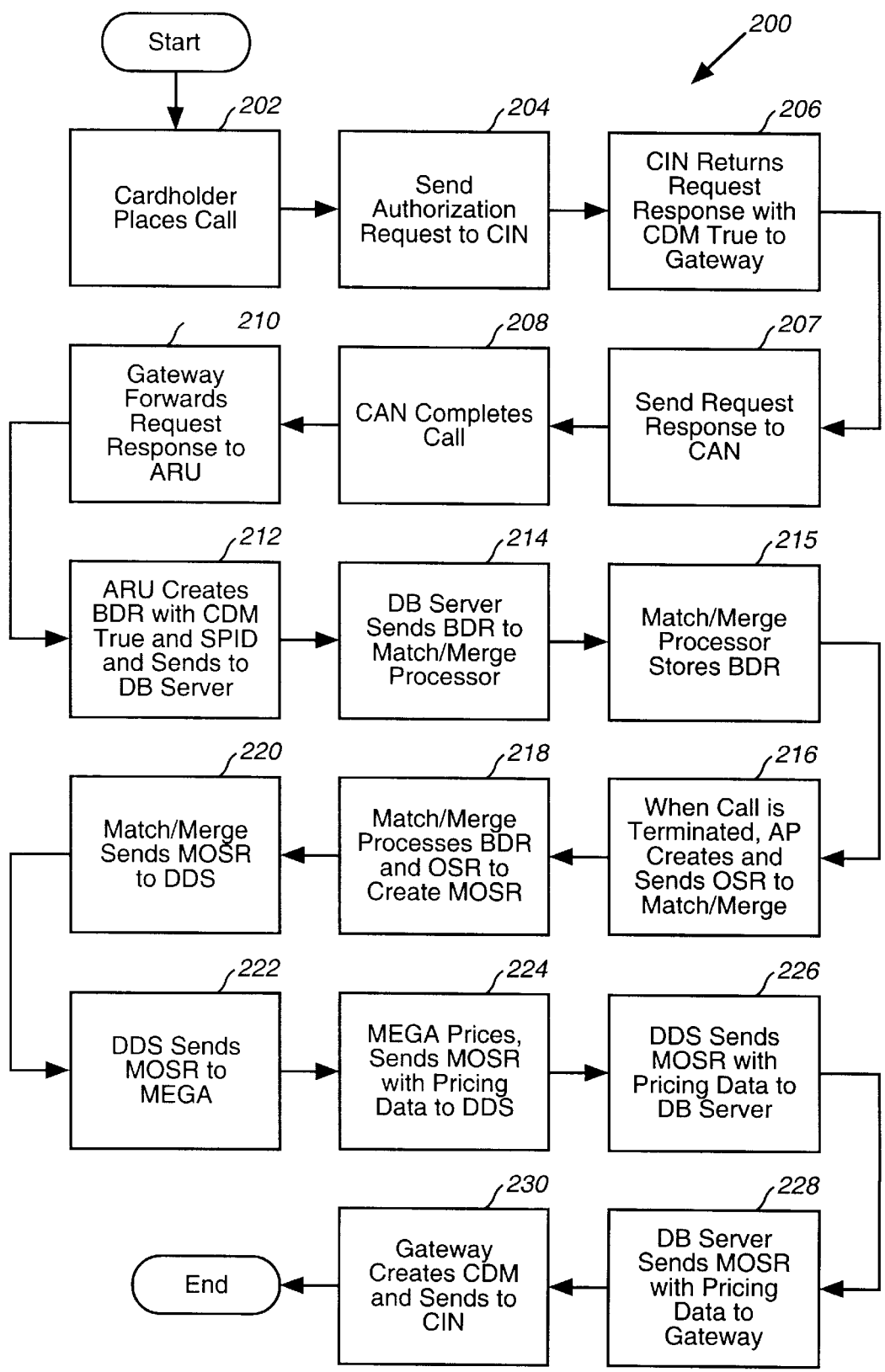
FIG. 2a is a flow diagram of a call disposition messaging process 200, implemented in system 100.

Memory 150-4 is accessible by CPU 150-1 over bus 150-6 and includes operating system 150-9, processing routines 150-7 and data partitions 150-8. Processing routines 150-7 include program instructions, executed by CPU 150-1. which implement the functions of each respective system. ISNAP 124. DBS 136, match/merge processor 126, DDS 139 and MEGA processor 140. Data partitions 150-8 are accessible by CPU 150-1 and store data used during the execution of the processing routines. In ISNAP 124, processing routines 150-7 include program instructions which select an operator group, either MTOC 120 or ARU-AS 122, to which calls are to be routed by ACD 112. In DBS 136, processing routines 150-7 include program instructions which implement steps 214 and 228 of process 200 of FIG. 2a, shown below. In match/merge processor 126, processing routines 150-7 include program instructions which implement step 218 of process 200 of FIG. 2a. shown below. In DDS 139. processing routines 150-7 include program instructions which implement steps 222 and 226 of process 200 of FIG. 2a. shown below. In MEGA processor 140, processing routines 150-7 include program instructions which implement step 224 of process 200 of FIG. 2a, shown below.

DBS 136 is a standard processor, such as, for example, an RS/6000. In one embodiment, match/merge processor 126 is a mainframe which is shared with other processing functions. In this embodiment, processor 126 provides batch processing of the input data. In another embodiment, processor 126 is a dedicated processor such as, for example, an RS/6000. In this embodiment, processor 126 provides near real time processing of the input data. DDS 139 is typically a plurality of standard processors, including mainframes and RS/6000s.

FIG. 2a is a flow diagram of a call disposition messaging process 200. implemented in system 100, which is best viewed in conjunction with FIG. 1a. In step 202, a cardholder places a calling card call in telecommunications network 104. Network 104 is accepting the use of the card, so it is the card acceptor network (CAN). Depending on the call type and customer input the call will be handled either by ARU 122 or MTOC 120. In step 204, the CAN sends an authorization request to the network which issued the card, the card issuer network (CIN). Here, the CIN is network 144. In step 206, the CIN returns to the gateway a request response validating use of the card and requesting a call disposition message (CDM). In step 208, gateway 134 forwards the request response to the ARU or MTOC which is handling the call. In step 210, the CAN completes the call. In step 212, the ARW or MTOC which is handling the call generates a billing detail record (BDR) including the request for a CDM and the service provider identifier (SPID) of the CIN. The ARU or MTOC which is handling the call sends the BDR to database server (DBS) 136. In step 214, DBS 136 sends the BDR to match/merge processor 126 which, in step 215, stores the BDR for processing upon call completion.

In step 216, when the call is completed, switch 106 indicates the call completion to AP 114, AP 114 generates an operator service record (OSR) and sends it to match/merge processor 126. In step 218, match/merge processor 126 matches the OSR with its corresponding BDR and merges the information to create a merged operator service record (MOSR). In step 220, match/merge processor 126 sends the MOSR to data distribution system (DDS) 139. In step 222, DDS 139 sends the MOSR to MEGA 140. In step 224, MEGA 140 performs pricing on the MOSR and sends the MOSR with the pricing data to DDS 139. In step 226, DDS 139 sends the MOSR with the pricing data to DBS 136. In step 228, DBS 136 sends the MOSR with the pricing data to gateway 134. In step 230, the gateway generates a call disposition message (CDM) from the MOSR with the pricing data and sends the CDM to the CIN.

Figure 2B:
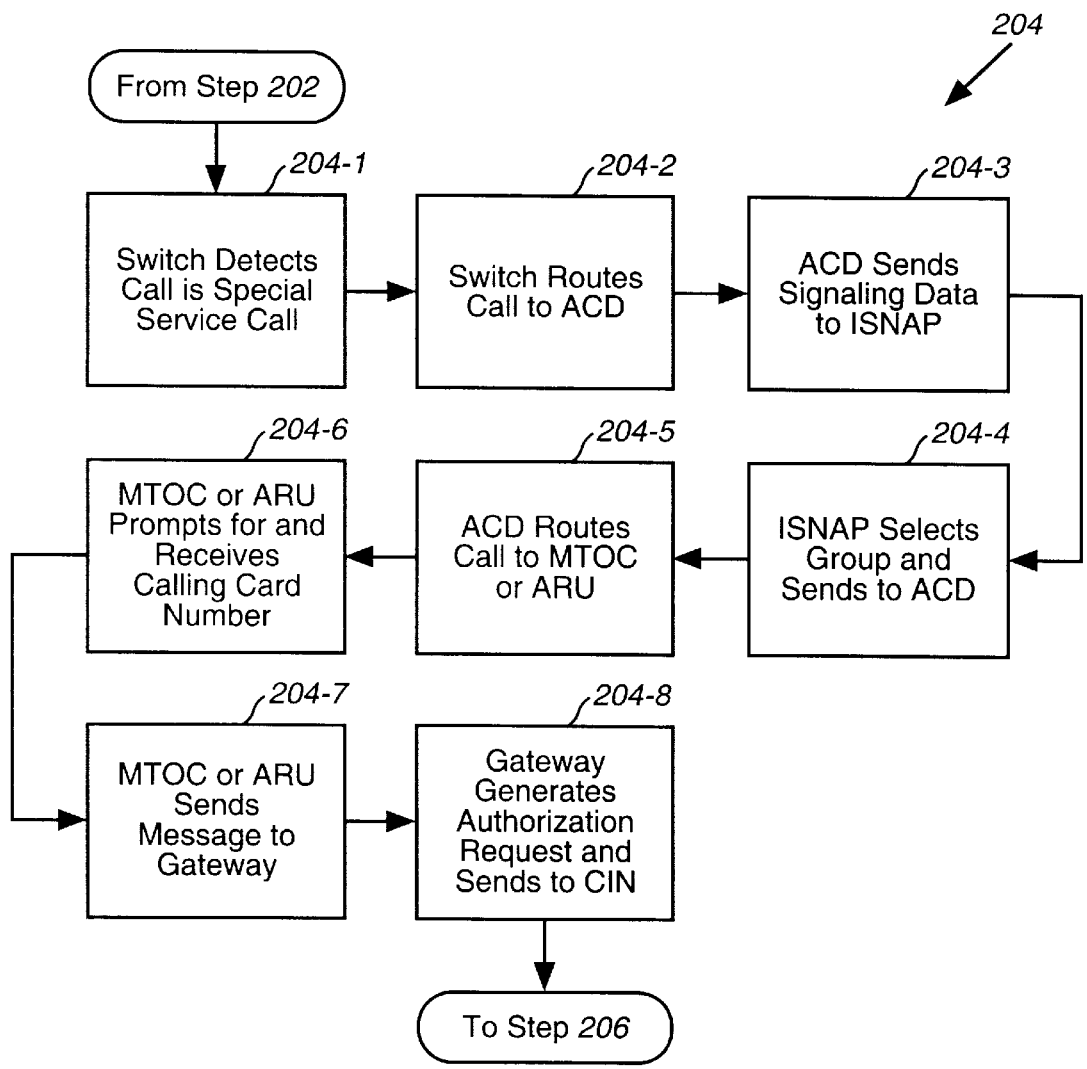

FIG. 2b is a flow diagram of the subprocess of step 204 of FIG. 2a. In step 204-1, switch 106 determines that the call is a special service call. Such a call is conventionally indicated by dialing a "0" rather than a "1", by dialing a long distance carrier access code, or by dialing a long distance carrier access "800" number. In step 204-2, switch 106 routes the special service call to ACD 112. In step 204-3, ACD 112 sends the signaling data related to the call to ISNAP 124. In step 204-4, ISNAP 124 selects available response equipment and sends this selection to ACD 112. In step 204-5. ACD 112 routes the call to the MTOC or ARU selected by ISNAP 124. In step 204-6, the selected MTOC or ARU prompts the caller for the special service information. The caller enters the information, whereupon it is recognized that the call is a calling card call. If the call is handled by a MTOC, the operator manually enters the number. If the call is handled by an ARU, the equipment detects touch tone keys pressed by the caller. In either case, in step 204-7, the selected MTOC or ARU sends a message containing the entered information to gateway 134. In step 204-8, gateway 134 generates an authorization request based on the received information and sends the request to the CIN, here another telecommunications network 144.

Figure 3:
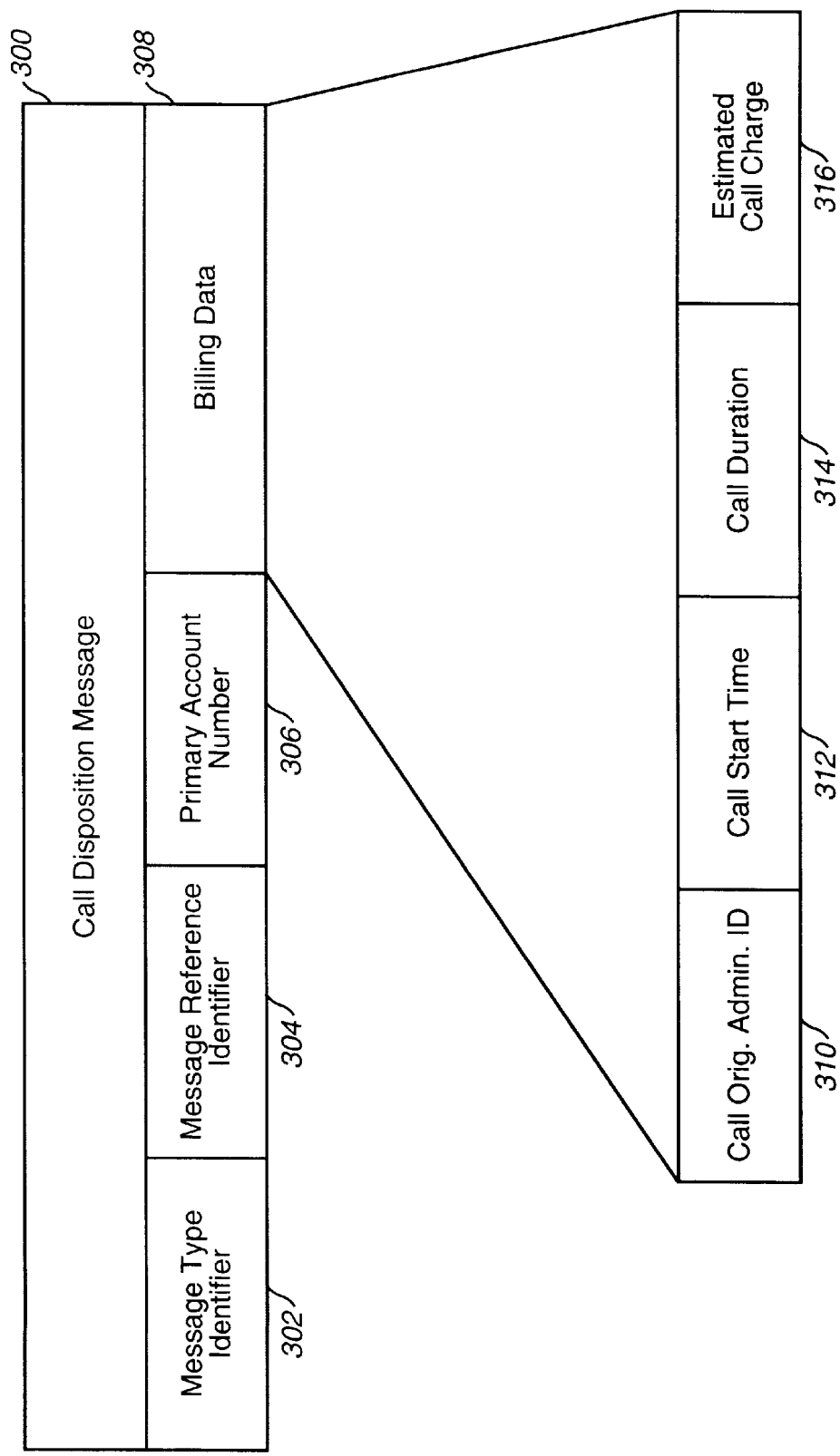
FIG. 3 is a format of a call disposition message (CDM) 300, generated by system 100.

FIG. 3 is the format of a call disposition message (CDM) 300, CDM 300 includes several components. Message type identifier 300 identifies the message as a call disposition. Message reference identifier 304 uniquely relates the message to a specific validation transaction. Primary account number 306 provides closure between the authorization request and the call disposition. CDM 300 also includes billing data 308.

Billing data 308 includes several components. Call originating administration identifier 310 identifies the telecommunications service provider which originated the call. It is a variable length field with a maximum length of 7 digits.

Call start time 312 indicates the time the call started. It is a fixed length field of 4 bytes, each byte containing two binary coded decimal diaits. It is encoded as shown in Table 1 below:

Table 1

Byte 1—digits 1 & 2: Month values: 01 to 12
Byte 2—digits 3 & 4: Day values: 01 to 31
Byte 3—digits 5 & 6: Hour values: 00 to 23
Byte 4—digits 7 & 8: Minute values: 00 to 59

Call duration 314 indicates the time duration of the call. It is a fixed length field of 3 bytes, each byte containing two binary coded decimal digits. It is encoded as shown in Table 2 below:

Table 2

Bytes 1 & 2—digits 1 to 4: Minute values: 0000 to 9999
Byte 3—digits 5 & 6: Second values: 00 to 59

Estimated call charge 316 is an optional field which indicates the estimated charge for the call in standard drawing rights (SDR). SDRs are a fictitious currency based upon the U.S. dollar, the Japanese Yen, the British pound and the German mark. The rate is published on a daily basis by the International Monetary Fund. It is used in international transactions to account/protect against currency fluctuations.

Field 316 is of variable length with a maximum length of 5 significant and 2 insignificant digits. The allowable values range from 0.00 to 99999.99.

Figure 4:
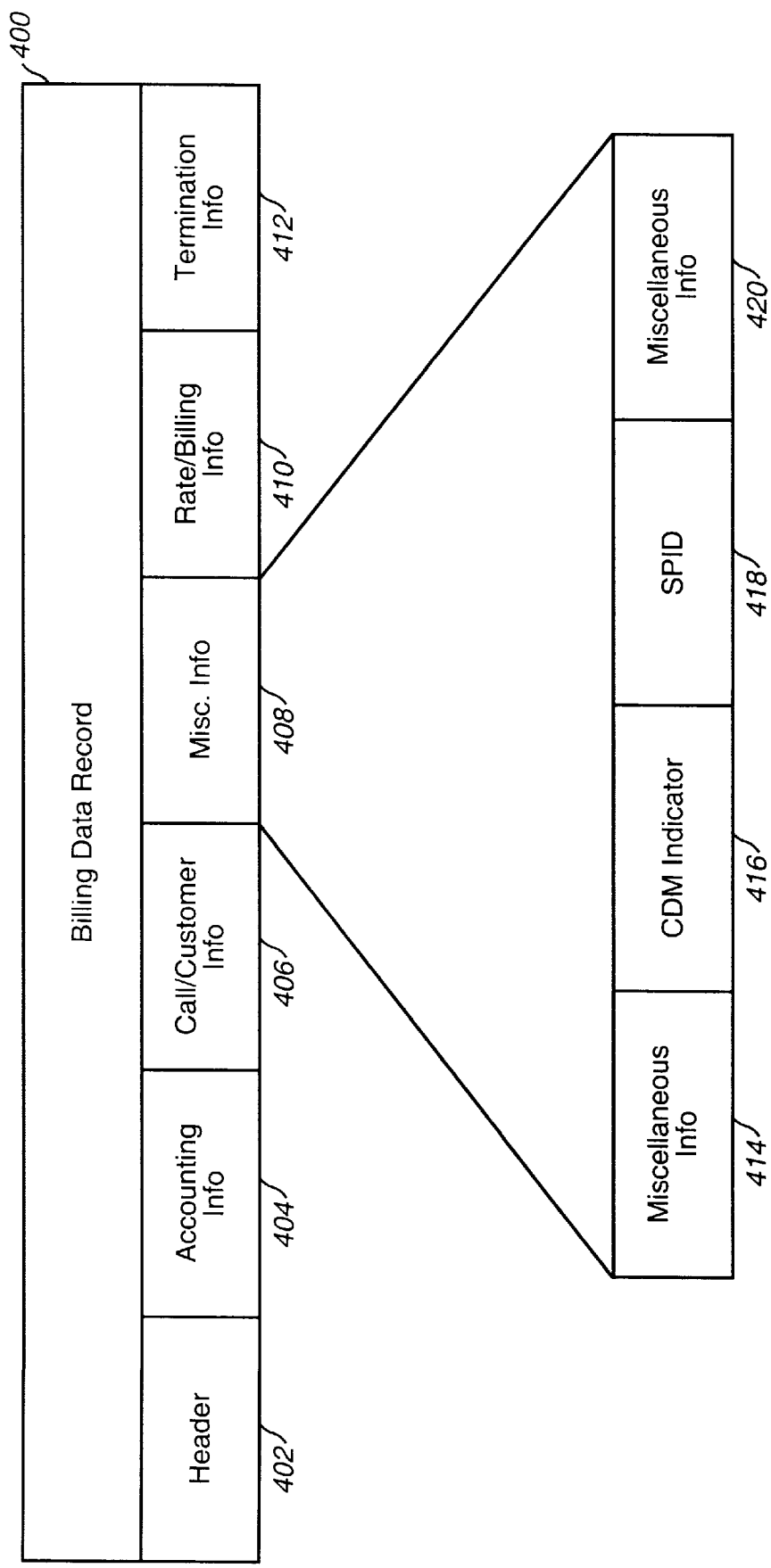
FIG. 4 is a format of a billing detail record (BDR) 400, generated by system 100.

FIG. 4 is a format of a billing detail record (BDR) 400. BDR 400 includes several components. Header 402 includes information about the BDR itself, such as, for example, the date and time the BDR was created, the record length, etc. Accounting information 404 includes information to direct the accounting process, such as, for example, the account number to which the call is to be billed, the location at which the BDR is to be processed, etc. Call/customer information 406 includes information about the call and the customer, such as, for example, the identity of customer and the expiration date of the card being used. Miscellaneous information 408 includes certain additional information such as, for example, the caller's name on collect and third party calls. Rate/Billing information includes information used in determining charges for the call, such as, for example, the rate plan in effect for the call. Termination information includes information about how the call was terminated, such as, for example, whether the call was completed or canceled, and if completed, the number to which it was completed.

Figure 5:
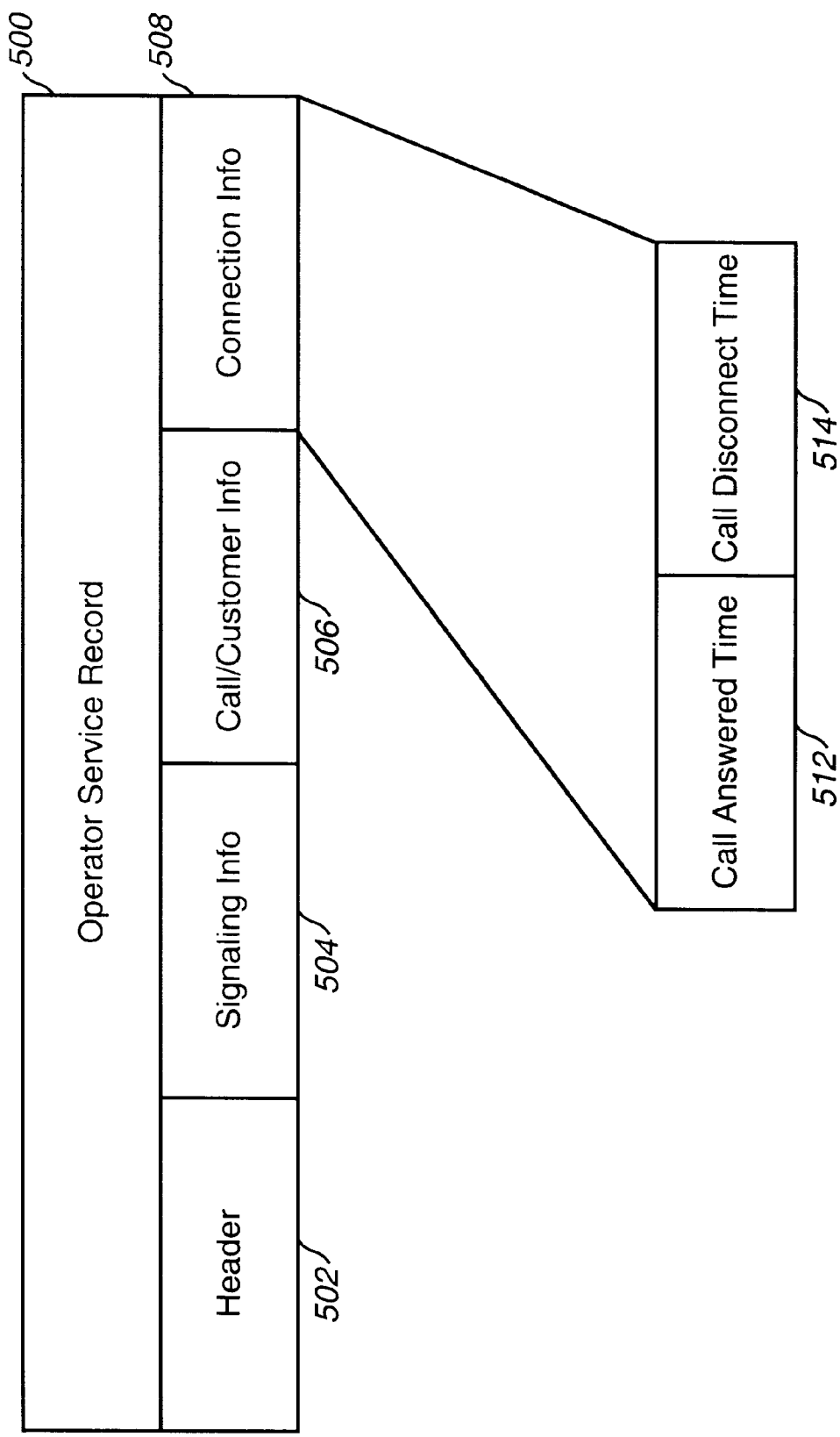
FIG. 5 is a format of an operator service record (OSR) 500, generated by system 100.

Miscellaneous information 408 includes miscellaneous information 414 and 420. but also includes information relating to call disposition messaging. CDM indicator 416 indicates whether a CDM was requested by the CIN in the request response. Indicator 416 is one character in length. It is set to "T" if a CDM is requested and is set to "F" if a CDM is not requested. SPID 418 indicates the service provider ID of the CIN requesting the CDM. It is three characters in length, right justified and padded with leading zeroes. If no CDM is requested, SPID 418 is set to "000". FIG. 5 is a format of an operator service record (OSR) 500. OSR 500 includes several components. Header 502 includes information about the OSR itself, such as, for example, the date and time the OSR was created, the switch where the OSR was created, etc. Signaling information 504 includes information about the routing of the call, such as, for example, the originating trunk group, the terminating trunk group. etc. Call/customer information 506 includes information about the call and the customer, such as, for example, the calling station ID, the calling party phone number. etc. Connection information 508 includes information about the time and duration that the call was connected. It includes call answered timestamp 512 and call disconnect timestamp 514.

Figure 6:
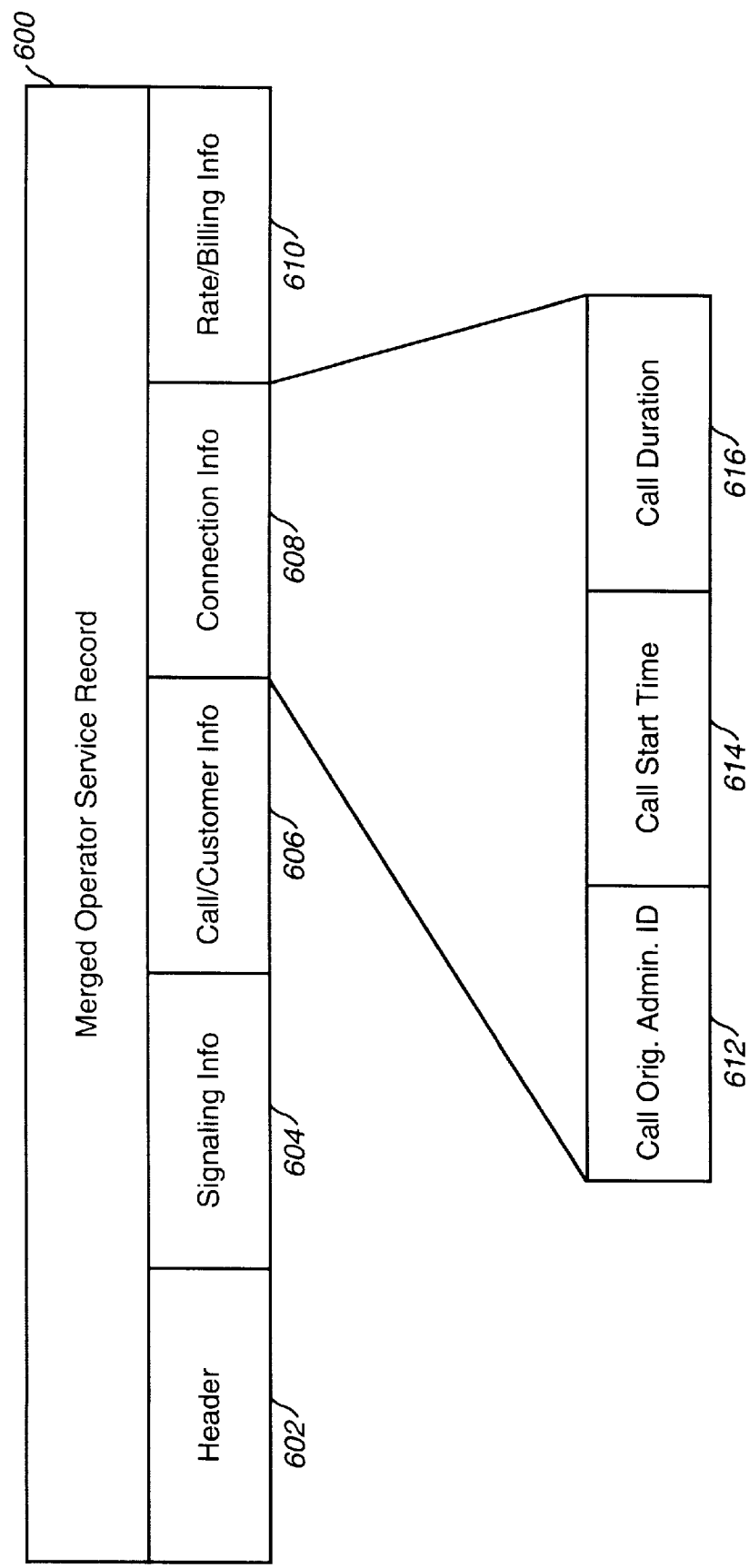
FIG. 6 is a tormal of a meriged operator service record (MOSR) 600, generated by system 100.

FIG. 6 is a format of a merged operator service record (MOSR) 600. It is derived from the information in both BDR 400 and OSR 500. In particular, it includes the call originating administration ID 612. which is derived from SPID 418. It includes call start time 614, which is derived from call answered timestamp 512. It also includes call duration 616, which is derived from the combination of call answered timestamp 512 and call disconnect timestamp 514.

Although specific embodiments have been disclosed, it will be seen by those of skill in the art that there are other embodiments possible which are equivalent to those disclosed.

What is claimed is:

1. In a telecommunications system having a card issuing network, a card accepting network and a call disposition messaging system, a method of generating call disposition messages comprising the steps of:

a) generating a billing detail record in the call disposition messaging system when a call is validated by the card issuing network;

b) generating an operator service record in the call disposition messaging system when the call is terminated in the card accepting network;

c) matching the billing detail record with the operator service record in the call disposition messaging system; and d) generating a call disposition message from the matched billing detail record and operator service record in the call disposition messaging system.

2. The method of claim 1, wherein the step of generating a billing detail record comprises the steps of:

receiving a calling card call at the card accepting network;

sending an authorization request from the call disposition messaging system to the card issuing network;

receiving a request response at the call disposition messaging system from the card issuing network, the request response validating the call and including a request for a call disposition message; and creating a billing detail record at the call disposition messaging system, the record including an indication that a call disposition message has been requested.

3. The method of claim 2, wherein the step of generating a call disposition message comprises the steps of:

generating a merged operator service record from the matched billing detail record and operator service record in the call disposition messaging system;

generating pricing data based on the merged operator service record in the call disposition messaging system; and generating a call disposition message based on the merged operator service record and the pricing data in the call disposition messaging system.

4. The method of claim 1, wherein the step of generating a call disposition message comprises the steps of:

generating a merged operator service record from the matched billing detail record and operator service record in the call disposition messaging system;

generating pricing data based on the merged operator service record in the call disposition messaging system; and generating a call disposition message based on the merged operator service record and the pricing data in the call disposition messaging system.

5. In a telecommunications network comprising a card issuing network, a card accepting network, a gateway for communicating with the card issuing network, an adjunct processor for extracting billing information from the card accepting network, a caller interaction system for obtaining information from the caller, a database server for routing data, a match/merge processor for processing data, a data distribution system for transporting data and a pricing system for providing pricing data, a method of generating call disposition messages comprising the steps of:

a) receiving a calling card call at the card accepting network;

b) sending an authorization request from the card accepting network to the card issuing network;

c) receiving a request response at the gateway, the request response validating the call and including a request for a call disposition message;

d) sending the request response from the gateway to the caller interaction system;

e) generating a billing detail record at the caller interaction system, the record including an indication that the call disposition message has been requested by the card issuing network, an indication of the identity of the card issuing network and information obtained from the caller by the caller interaction system;

f) sending the billing detail record from the caller interaction system to the database server;

g) sending the billing detail record from the database server to the match/merge processor;

h) storing the billing detail record in the match/merge processor;

i) sending an operator service record from the adjunct processor to the match/merge processor when the call is terminated;

j) matching the operator service record with the corresponding billing detail record in the match/merge processor;

k) generating a merged operator service record in the match/merge processor;

l) sending the merged operator service record from the match/merge processor to the data distribution system;

m) sending the merged operator service record from the data distribution system to the pricing system;

n) generating pricing data based on the merged operator services record in the pricing system;

o) sending the pricing data from the pricing system to the data distribution system;

p) sending the pricing data from the data distribution system to the database server;

q) sending the pricing data from the database server to the gateway;

r) creating a call disposition message in the gateway; and s) sending the call disposition message to the card issuing network.

6. The method of claim 5, wherein the telecommunications network further comprises an automatic call distributor for routing calls and a processor for determining call routing, and wherein the step (b) further comprises the steps of:

detecting that the call is a special service call in the card accepting network;

routing the call from the card accepting network to an automatic call distributor;

sending the signaling data from the automatic call distributor to the call routing processor;

selecting the caller interaction system to which the call is to be routed in the call routing processor;

routing the call from the automatic call distributor to the selected caller interaction system;

obtaining information from the caller in the caller interaction system;

sending the obtained information from the caller interaction system to the gateway;

generating an authorization request using the information obtained by the caller interaction system in the gateway; and sending, the authorization request from the gateway to the card issuing network.

7. In a telecommunications system having a card issuing network and a card accepting network, a system for generating call disposition messages comprising:

first billing, information means, coupled to the card issuing, network, for generating a billing, detail record when a call is validated by the card issuing, network;

second billing information means, coupled to the card accepting network, for generating, an operator service record when the call is completed;

billing, information matching means, coupled to the first billing information means and the second billing information means, for matching the billing, detail record with the operator service record; and message means, coupled to the billing, information matching device, for generating a call disposition message from the matched billing detail record and the operator service record.

8. The system of claim 7, wherein the first billing information means comprises:

a transmitter, coupled to the card issuing network, for sending, an authorization request to the card issuing, network;

a receiver, coupled to the card accepting network, for receiving a request response from the card issuing network, the request response validating the call and including a request for a call disposition message; and billing detail record means, coupled to the card accepting network, for generating a billing detail record, the record including an indication that a call disposition message has been requested.

9. The system of claim 8, wherein the message means comprises:

billing information merging means, coupled to the billing information matching device, for generating a merged operator service record from the matched billing detail record and the operator service record in the call disposition messaging system;

pricing data means, coupled to the billing information merging device, for generating pricing data based on the merged operator service record in the call disposition messaging system; and a call disposition message means, coupled to the pricing data generator, for generating a call disposition message based on the merged operator service record and the pricing data in the call disposition messaging system.

10. The system of claim 7, wherein the message means comprises:

billing information merging means, coupled to the billing information matching means, for generating a merged operator service record from the matched billing detail record and the operator service record in the call disposition messaging system;

pricing data means, coupled to the billing information merging means, for generating pricing data based on the merged operator service record in the call disposition messaging system; and call disposition message means, coupled to the pricing data generator, for generating a call disposition message based on the merged operator service record and the pricing data in the call disposition messaging system.

11. In a telecommunications system having a card issuing network and a card accepting network, a system for generating call disposition messages comprising:

authorization request means, coupled to the card issuing network, for generating and sending an authorization request to the card issuing network;

request response means, coupled to the card accepting network, for receiving a request response, the request response validating the call and including a request for a call disposition message;

operator service means, coupled to the card accepting network, for obtaining information from the caller;

first billing information means, coupled to the request response receiver and the operator service means, for creating a billing detail record, the record including an indication that a call disposition message has been requested by the card issuing network, an indication of the identity of the card issuing network and information obtained from the caller;

billing information storage means, coupled to the first billing information means, for storing the billing detail record;

second billing information means, coupled to the call accepting network, for creating an operator service record when the call is terminated;

billing information matching means, coupled to the billing information storage means and the second billing information means, for matching the operator service record with the corresponding billing detail record;

billing information merging means, coupled to the billing information matching means, for creating a merged operator service record;

pricing data means, coupled to the billing information merging means, for generating pricing data based on the merged operator services record;

first call disposition message means, coupled to the pricing data means, for creating a call disposition message; and second call disposition message means, coupled to the first call disposition means, for transmitting the call disposition message to the card issuing network.

12. The system of claim 11, wherein the authorization request means comprises:

receiver means, coupled to the call accepting network, for receiving the signaling data pertaining to the call;

call distributing means, coupled between the call accepting network and the operator service means, for routing the call from the call accepting network to the operator service device;

processing means, coupled to the receiver means and the call distributing means, for controlling the call distributing means based on the received signaling data;

adjunct processor means, coupled to the operator service means, for generating an authorization request using the information obtained from the caller; and signaling means, coupled to the adjunct processor means and the card issuing network, for sending the authorization request to the card issuing network.

* * * * *